US008633909B2

(12) United States Patent
Miyazawa et al.

(10) Patent No.: US 8,633,909 B2
(45) Date of Patent: Jan. 21, 2014

(54) INFORMATION PROCESSING APPARATUS, INPUT OPERATION DETERMINATION METHOD, AND INPUT OPERATION DETERMINATION PROGRAM

(75) Inventors: Yusuke Miyazawa, Tokyo (JP); Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 57 days.

(21) Appl. No.: 12/980,543

(22) Filed: Dec. 29, 2010

(65) Prior Publication Data
US 2011/0175831 A1 Jul. 21, 2011

(30) Foreign Application Priority Data
Jan. 19, 2010 (JP) ................. P2010-009184

(51) Int. Cl.
G06F 3/041 (2006.01)
(52) U.S. Cl.
USPC ........................................ 345/173; 178/18.06
(58) Field of Classification Search
USPC ................. 345/173–178; 178/18.01–19.04
See application file for complete search history.

(56) References Cited

U.S. PATENT DOCUMENTS

| 7,786,980 B2* | 8/2010 | Lashina | 345/173 |
| 2003/0189211 A1* | 10/2003 | Dietz | 257/79 |
| 2006/0267953 A1* | 11/2006 | Peterson et al. | 345/173 |
| 2008/0018604 A1* | 1/2008 | Paun et al. | 345/168 |
| 2008/0036743 A1* | 2/2008 | Westerman et al. | 345/173 |
| 2008/0211783 A1* | 9/2008 | Hotelling et al. | 345/173 |
| 2008/0211784 A1* | 9/2008 | Hotelling et al. | 345/173 |
| 2008/0231610 A1* | 9/2008 | Hotelling et al. | 345/173 |
| 2008/0278450 A1* | 11/2008 | Lashina | 345/173 |
| 2009/0174684 A1* | 7/2009 | Ryu et al. | 345/173 |
| 2009/0237372 A1* | 9/2009 | Kim et al. | 345/173 |
| 2009/0244019 A1* | 10/2009 | Choi | 345/173 |
| 2009/0295715 A1* | 12/2009 | Seo et al. | 345/156 |
| 2009/0312101 A1* | 12/2009 | Pope | 463/36 |
| 2010/0020035 A1* | 1/2010 | Ryu et al. | 345/173 |
| 2010/0026723 A1* | 2/2010 | Nishihara et al. | 345/671 |
| 2010/0107099 A1* | 4/2010 | Frazier et al. | 715/765 |
| 2010/0169772 A1* | 7/2010 | Stallings et al. | 715/702 |
| 2011/0018811 A1* | 1/2011 | Miernik | 345/173 |
| 2011/0022393 A1* | 1/2011 | Waller et al. | 704/270 |
| 2011/0148770 A1* | 6/2011 | Adamson et al. | 345/173 |
| 2011/0164029 A1* | 7/2011 | King et al. | 345/419 |
| 2011/0179368 A1* | 7/2011 | King et al. | 715/769 |

FOREIGN PATENT DOCUMENTS

| JP | 2006-302126 | 11/2006 |
| JP | 4547622 | 7/2010 |

* cited by examiner

Primary Examiner — Dmitriy Bolotin
(74) Attorney, Agent, or Firm — Sherr & Jiang, PLLC

(57) ABSTRACT

An information processing apparatus includes: a touch detection unit detecting touch of an instruction object on an operation surface; a proximity detection unit detecting proximity of the instruction object to the operation surface; and a control unit determining whether the touch of the instruction object is a predetermined input operation based on the detection result, which is obtained by the touch detection unit when the touch detection unit detects the touch of the instruction object, and at least one of the detection results, which are obtained by the proximity detection unit before and after the touch of the instruction object.

13 Claims, 10 Drawing Sheets

FIG. 5
▨ TOUCH PART (50 ≤ OUTPUT VALUE)
▨ PROXIMITY PART (20 ≤ OUTPUT VALUE < 50)
☐ NON-PROXIMITY PART (OUTPUT VALUE < 20)
× TOUCH POSITION, PROXIMITY POSITION
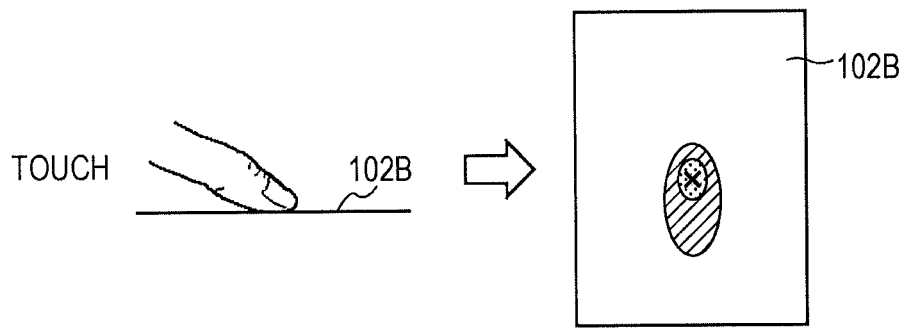
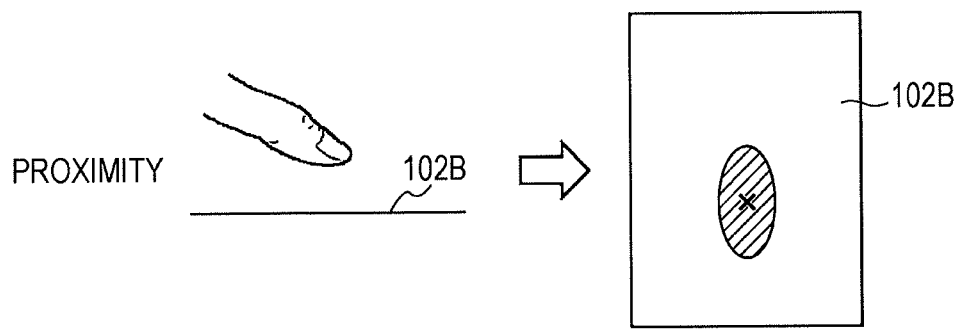

INFORMATION PROCESSING APPARATUS, INPUT OPERATION DETERMINATION METHOD, AND INPUT OPERATION DETERMINATION PROGRAM

BACKGROUND OF THE INVENTION

1. Field of the Invention

The present invention relates to an information processing apparatus, an input operation determination method, and an input operation determination program and is suitable for an information processing apparatus including, for example, a touch panel.

2. Description of the Related Art

In recent years, information processing apparatuses including a touch panel have come into wide use. The information processing apparatuses detect touch of an instruction object (a finger, a touch pen, or the like) on the touch panel, recognize a touch operation such as tapping or flicking, and receive the touch operation as an input operation to perform various processes in response to the touch.

Tapping refers to an operation of touching one arbitrary point on an operation surface with an instruction object and immediately detaching the instruction object. Flicking refers to an operation of lightly flicking the operation surface with an instruction object.

In recent years, an information processing apparatus capable of detecting not only the touch of an instruction object on a touch panel but also proximity of the instruction object to the touch panel has been suggested (for example, see Japanese Unexamined Patent Application Publication No. 2006-302126). In the information processing apparatus, even when a finger touching the touch panel becomes detached from the touch panel but is in the proximity of the touch panel, a process started when the finger touches the operation surface is continued.

Thus, for example, even when a user tries to press a button displayed on a screen for a long time but the finger is detached from the touch panel due to vibration or the like during pressing of the button, a process similar to the process for an extended press of the button, that is, the process intended by a user, can be performed.

SUMMARY OF THE INVENTION

In the information processing apparatus including the touch panel according to the related art, for example, the positions (which are also referred to as a touch position) at which the touch panel is touched with an instruction object are detected at an interval of a constant time and a touch operation is recognized based on the detection result.

For example, such an information processing apparatus recognizes that flicking is performed, when detecting the movement of the touch position while the operation surface is touched with the instruction object. The information processing apparatus recognizes that tapping is performed when the movement of the touch position is not detected.

In recent years, in the information processing apparatus, however, as sensitivity of the touch panel increases in order to detect the proximity of an instruction object, a time interval (that is, a sampling interval) at which the touch or proximity of the instruction object is detected may become longer than that according to the related art.

In this case, since a time in which the operation surface is touched with the instruction object is very short in flicking, for example, the information processing apparatus may detect only one touch position. Then, the movement of the touch position may not be detected and thus it is erroneously recognized that tapping may be performed, although the flicking is performed.

In the information processing apparatus including the touch panel, it is necessary to improve recognition precision of a touch operation (input operation by the touch of an instruction object).

It is desirable to provide an information processing apparatus, an input operation determination method, and an input operation determination program capable of improving recognition precision of an input operation by touch of an instruction object.

According to an embodiment of the invention, there is provided an information processing apparatus including: a touch detection unit detecting touch of an instruction object on an operation surface; a proximity detection unit detecting proximity of the instruction object to the operation surface; and a control unit determining whether the touch of the instruction object is a predetermined input operation based on the detection result, which is obtained by the touch detection unit when the touch detection unit detects the touch of the instruction object, and at least one of the detection results, which are obtained by the proximity detection unit before and after the touch of the instruction object.

In the information processing apparatus according to the embodiment of the invention, recognition precision of the input operation can be improved compared to a case where the input operation is recognized based on only the detection result of the touch detection unit, by determining whether the touch of the instruction object is the predetermined input operation based on the detection result obtained by the touch detection unit and the detection result obtained by the proximity detection unit. Thus, the input operation can reliably be recognized, even when it may not be recognized which input operation the touch of the instruction object is based on only the detection result of the touch detection unit. For example, even when the time interval at which the touch of the instruction object is detected is not shortened, the recognition precision of the input operation by the touch of the instruction object can be improved.

According to the embodiment of the invention, the recognition precision of the input operation can be improved compared to the case where the input operation is recognized based on only the detection result of the touch detection unit, by determining whether the touch of the instruction object is the predetermined input operation based on the detection result obtained by the touch detection unit and the detection result obtained by the proximity detection unit. Thus, the input operation can reliably be recognized, even when it may not be recognized which input operation the touch of the instruction object is based on only the detection result of the touch detection unit. For example, even when the time interval at which the touch of the instruction object is detected is not shortened, the recognition precision of the input operation by the touch of the instruction object can be improved. Accordingly, the information processing apparatus, an input operation determination method, and an input operation determination program capable of improving the recognition precision of the input operation by the touch of the instruction object can be embodied.

BRIEF DESCRIPTION OF THE DRAWINGS

FIG. 5 is a schematic diagram illustrating description of detection of a touch position and a proximity position.

DESCRIPTION OF THE PREFERRED EMBODIMENTS

Hereinafter, preferred embodiments (hereinafter, referred to as embodiments) of the invention will be described.

The description will be made in the following order.
1. Embodiment
2. Other Embodiments
1. Embodiment
1-1. Overview of Embodiment The overview of the embodiment will be described. After the overview of the embodiment is described, a specific example of the embodiment will be described.

Figure 1:
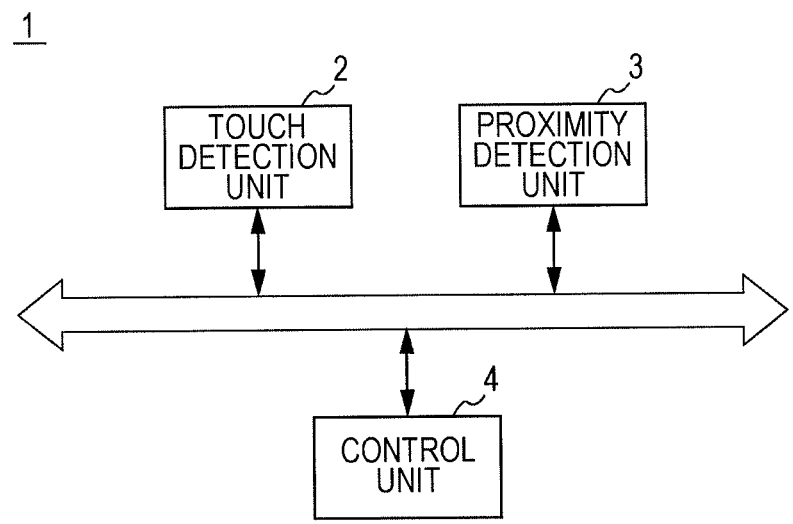
FIG. 1 is a block diagram illustrating the overall functional configuration of an information processing apparatus according to an embodiment.

In FIG. 1, Reference Numeral 1 denotes an information processing apparatus. The information processing apparatus 1 includes a touch detection unit 2 detecting touch of an instruction object on an operation surface (for example, an operation surface of a touch panel). The information processing apparatus 1 also includes a proximity detection unit 3 detecting proximity of the instruction object to the operation surface.

The information processing apparatus 1 also includes a control unit 4 determining whether touch of the instruction object is a predetermined input operation, based on the detection result obtained by the touch detection unit 2 when the touch detection unit 2 detects the touch of the instruction object and at least one of the detection results obtained by the proximity detection unit 3 before and after the touch of the instruction object.

The information processing apparatus 1 determines whether the touch of the instruction object is a predetermined input operation based on both the detection result of the touch detection unit 2 and the proximity detection unit 3. Accordingly, it is possible to improve recognition precision of the input operation, compared to a case where the input operation is recognized based on only the detection result of the touch detection unit 2.

Thus, in the information processing apparatus 1, it is possible to reliably recognize the input operation even when it may not be recognized which input operation the touch of the instruction object is based on only the detection result of the touch detection unit 2 (for example, the detected touch position is one while the operation surface is touched with the instruction object). Accordingly, in the information processing apparatus 1, it is possible to improve the recognition precision of the input operation by the touch of the instruction object, even when a time interval (sampling interval) at which the operation surface is touched with the instruction object is not shortened.

More specifically, the touch detection unit 2 may detect the touch positions of the instruction object on the operation surface at a predetermined time interval. The control unit 4 may determine whether the touch of the instruction object is a predetermined input operation based on the number of touch positions detected by the touch detection unit 2 when the operation surface is touched with the instruction object.

The control unit 4 may determine whether the touch of the instruction object is a predetermined input operation based on the touch position of the instruction object detected by the touch detection unit 2 and at least one of proximity positions of the instruction object detected by the proximity detection unit 3 before and after the touch of the instruction object.

More specifically, the control unit 4 may determine whether the touch of the instruction object is a predetermined input operation based on a distance between two points of the touch position and the proximity position. Moreover, the control unit 4 may determine whether the touch of the instruction object is a predetermined input operation based on an angle formed by straight lines passing through two points of the touch position and the proximity position.

A specific example of the information processing apparatus 1 having such a configuration will be described in detail below.

1-2. Outer Configuration of Portable Terminal

Figure 2:
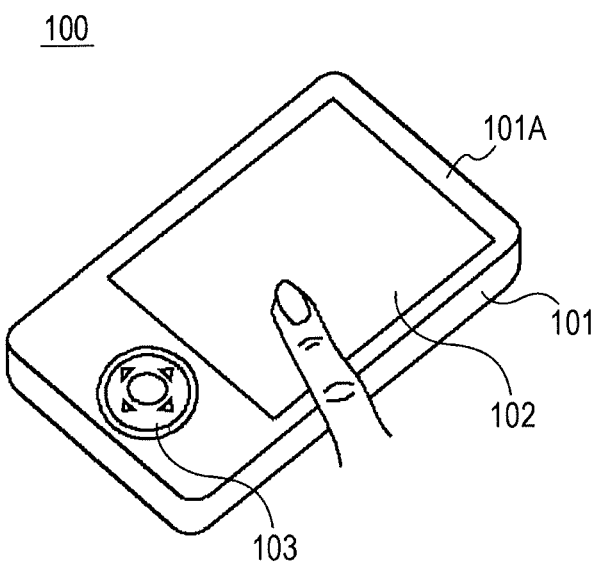
FIG. 2 is a schematic diagram illustrating the outer configuration of a portable terminal.

Next, the outer configuration of a portable terminal 100 which is a specific example of the above-described information processing apparatus 1 will be described with reference to FIG. 2.

The portable terminal 100 includes a casing 101 with an approximately flat rectangular shape of a size graspable with one hand.

A rectangular touch screen 102 is disposed in the middle portion of a front surface 101A of the casing 101. The touch screen 102 includes a liquid crystal panel and a thin transparent touch panel covering a display surface of the liquid crystal panel. In the touch panel, multi-touch can be implemented, for example, in an electrostatic capacitance type.

The portable terminal 100 recognizes a touch operation and a proximity operation on and to the touch screen 102 by a finger (a touch pen or the like can be used) as an input operation. The touch operation refers to an input operation performed when the touch screen is touched with a finger. The proximity operation refers to an input operation performed when the touch screen is not touched with a finger and is in proximity to a finger.

On the front surface 101A of the casing 101 of the portable terminal 100, an operation button 103 is also disposed in the vicinity of the touch screen 102.

1-3. Hardware Configuration of Portable Terminal

Next, the hardware configuration of the portable terminal 100 will be described with reference to FIG. 3. In the portable terminal 100, a CPU 110 develops a program stored in a non-volatile memory 111 into a RAM 112 and reads the program to perform various processes according to this program and control each unit. A central processing unit is abbreviated to CPU and a random access memory is abbreviated to RAM.

When recognizing that the touch operation or the proximity operation is performed on or to the touch screen 102, the CPU 110 receives this operation as an input operation and performs processing according to an input operation.

The touch screen 102 includes a liquid crystal panel 102A which is a display device displaying various kinds of information and a touch panel 102B which is an input operation device receiving an input operation.

The touch panel 102B is an electrostatic capacitance type touch panel, as described above, and has a plurality of electrostatic sensors (not shown) arranged in a lattice form on the operation surface. In each of the plurality of electrostatic sensors, an output value varies depending on the electrostatic capacitance varying as a conductor such as a finger approaches the operation surface.

Figure 4:
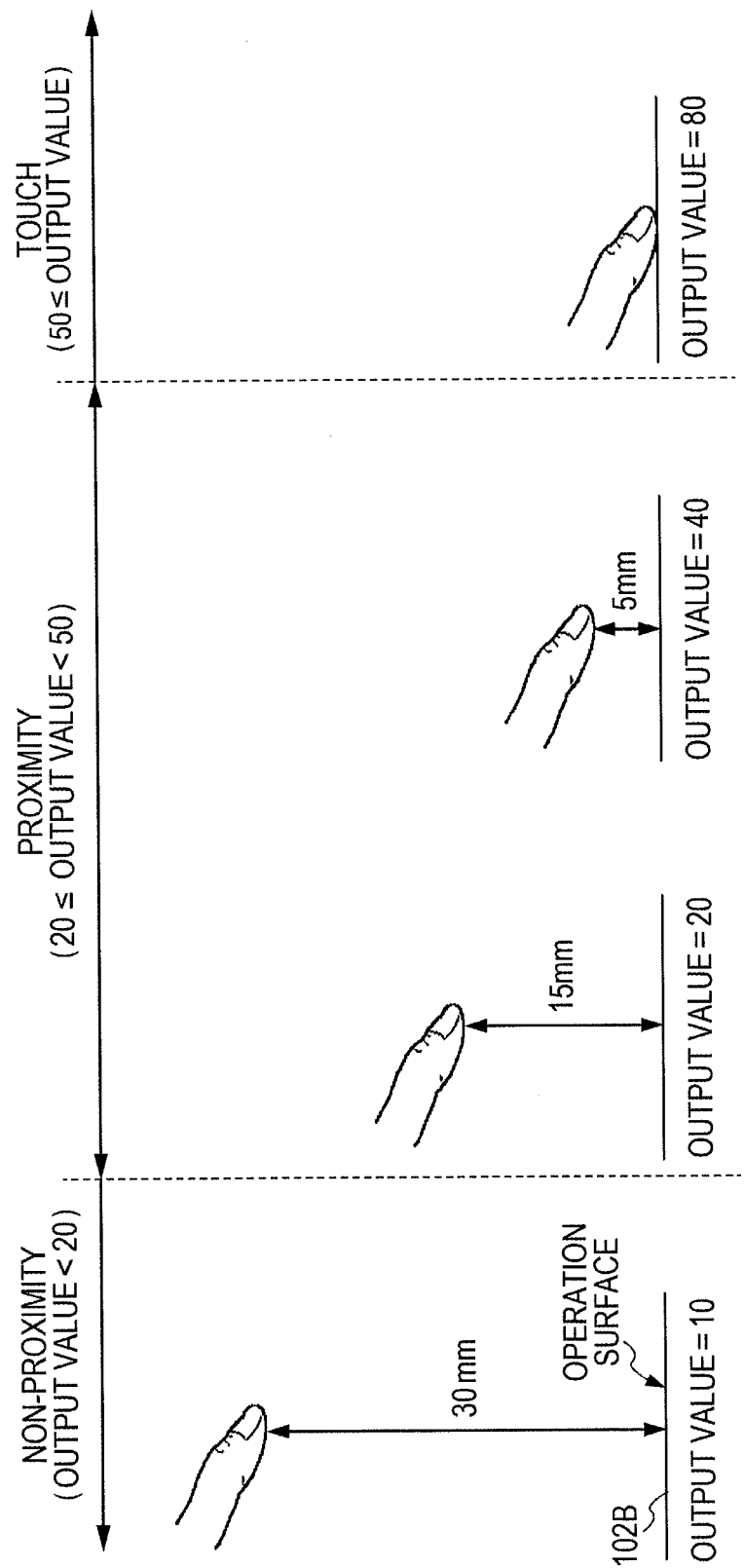
FIG. 4 is a schematic diagram illustrating description about detection of a variation in an output value of an electrostatic sensor.

As shown in FIG. 4, suppose that a finger is actually approaching the operation surface of the touch panel 102B. At this time, for example, the output value of the electrostatic sensor located directly below the finger varies to "10", "20", and "40" when the distance between the operation surface and the finger is 30 mm, 15 mm, and 5 mm, respectively. The output value of the electrostatic sensor varies to the maximum value "80" when the operation surface is touched with the finger.

The CPU 110 acquires the varied output values of the electrostatic sensors and the positions of the electrostatic sensors from the touch panel 102B. Based on the output values and the positions of the electrostatic sensors, the CPU 110 distinguishes a part touched with a finger on the operation surface of the touch panel 102B, a part in the proximity of a finger to the operation surface, and a part which is neither touched or in the proximity of a finger from each other. Hereinafter, the part touched with a finger is referred to as a touch part, the part in the proximity of a finger is referred to as a proximity part, and the part which is neither touched nor in the proximity of a finger is referred to as a non-proximity part.

Specifically, as shown in FIG. 5, the CPU 110 recognizes a part in which the output value of the electrostatic sensor on the operation surface of the touch panel 102B is "50" or more, as the touch part. The CPU 110 recognizes a part in which the output value is "20" or more and less than "50", as the proximity part. The CPU 110 recognizes in a part in which the output value is less than "20", as the non-proximity part.

The CPU 110 can detect, for example, whether the operation surface is touched with a finger, is in proximity to a finger, or the like, by recognizing the touch part, the proximity part, and the non-proximity part on or to the operation surface of the touch panel 102B in the above way. Moreover, the CPU 110 can detect at which position the operation surface is touched with a finger or is in the proximity to the finger.

At this time, when there is the touch part, the CPU 110 is configured to detect, for example, the center of gravity or the center of the touch part (the center of gravity or the center of the side of a finger touching the operation surface) as a touch position. When there is only the proximity part, the CPU 110 is configured to detect, for example, the center of gravity or the center of the proximity part (the center of gravity or the center of the side of a finger which is in the proximity to the operation surface) as a proximity position.

The CPU 110 detects shift in the touch position and the proximity position by acquiring the output value of each electrostatic sensor from the touch panel 102B at an interval of a constant time and recognizing the touch part, the proximity part, and the non-proximity part.

The CPU 110 specifies the movement of a finger on the touch panel 102B based on the shift and recognizes the touch operation and the proximity operation on and to the touch screen 102 based on the movement of the finger. The CPU 110 receives the touch operation or the proximity operation as an input operation and executes a process according to this input operation.

When recognizing an operation of pressing down the operation button 103, the CPU 110 receives this operation as an input operation and executes a process according to this input operation.

For example, suppose that a user drags his finger on the touch screen 102, for example, when some of the lists of music titles acquired from music data stored in the non-volatile memory 111 are displayed on the touch screen 102. The dragging refers to an operation of moving the finger in a state the finger touches the operation surface.

At this time, when recognizing the dragging on the touch screen 102, the CPU 110 receives the dragging as an input operation of scrolling the lists and scrolls the lists in synchronization with the movement of the finger in the dragging.

In addition, suppose that the user flicks the touch screen 102, when the lists of the music titles are displayed on the touch screen 102.

At this time, when recognizing the flicking on the touch screen 102, the CPU 110 receives the flicking as an input operation of scrolling the lists, and then continues scrolling the lists for a given time according to the speed, direction, and the like of the flicking and stops the scrolling.

In addition, suppose that the user taps an arbitrary music title when the lists of the music titles are displayed on the touch screen 102.

Figure 3:
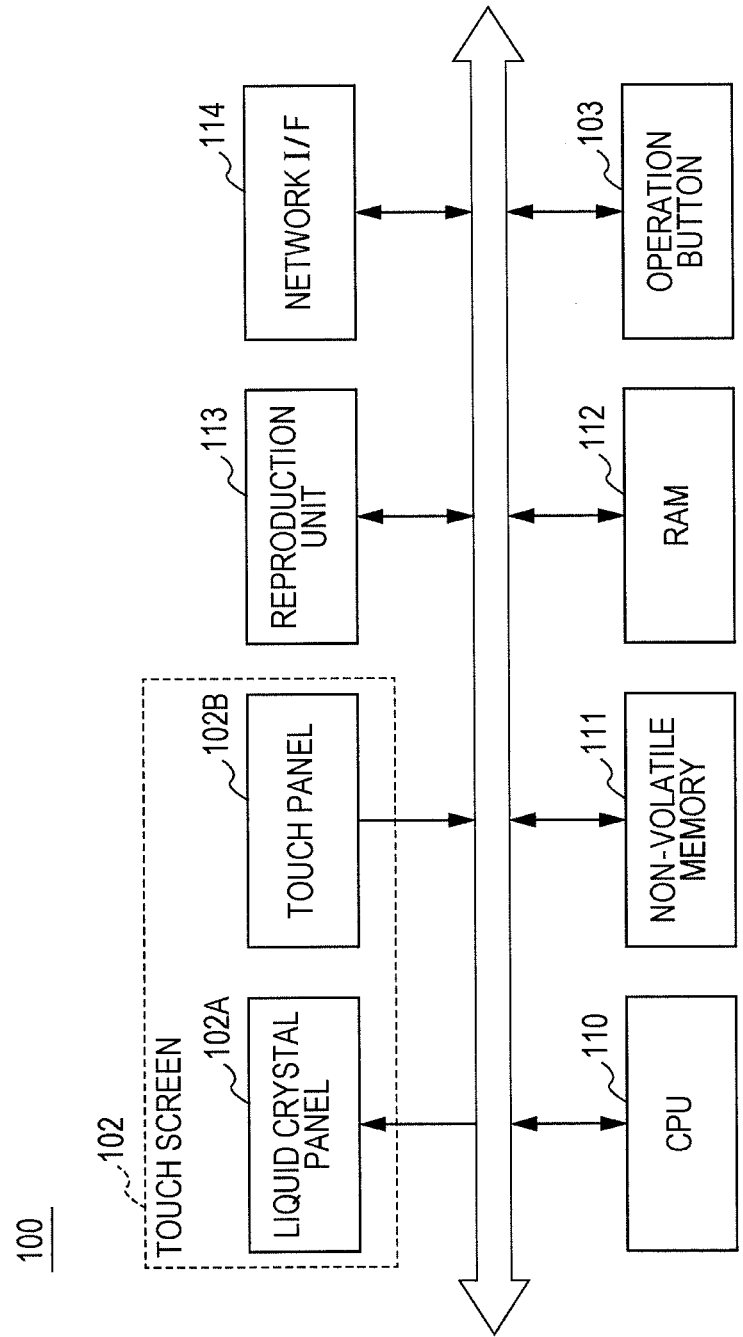
FIG. 3 is a block diagram illustrating the hardware configuration of the portable terminal.

At this time, when recognizing the tapping on the touch screen 102, the CPU 110 receives the tapping as an input operation of reproducing the music data, and then reads the music data corresponding to the tapped music title from the non-volatile memory 111 and transmits the music data to the reproduction unit 113 (see FIG. 3).

Under the control of the CPU 110, the reproduction unit 113 performs reproduction processes such as a decoding process, a digital-to-analog conversion process, and an amplification process on the music data to obtain voice signals and outputs the voice signals from a headphone terminal (not shown).

In this manner, the user can listen to music through a headphone connected to the headphone terminal.

At this time, the CPU 110 acquires information regarding a music title, an artist name, and the like in the read music data and displays the information, for example, on the liquid crystal panel 102A. Thus, the information regarding the music being reproduced can be suggested to the user.

For example, suppose that when a web browser icon is displayed on the touch screen 102 to activate a web browser, the user taps this web browser icon.

At this time, when recognizing the tapping on the touch screen 102, the CPU 110 receives the tapping as an input operation of activating a web browser, activates the web browser, and displays a web browser screen on the liquid crystal panel 102A.

At this time, the CPU 110 communicates with a server on a network through the network interface 114 and acquires page data of web pages from the server. The CPU 110 displays a page image based on the page data on the web browser screen.

In this manner, the user can browse the web pages on the web browser screen.

In addition, suppose that the user performs shuffle on the touch screen 102 when the web browser screen is displayed on the touch screen 102. The shuffle refers to a proximity operation of depicting a zigzag shape with the finger when the finger approaches the touch panel.

At this time, when recognizing the shuffle on the touch screen 102, the CPU 110 receives the shuffle as an input operation of returning to the previous page image and displays the previous page image on the web browser screen instead of the page image being currently displayed.

A specific hardware example of the touch detection unit 2 and the proximity detection unit 3 of the information processing apparatus 1 described in the overview of this embodiment is the touch panel 102B of the above-described portable terminal 100. A specific hardware example of the control unit 4 of the information processing apparatus 1 is the CPU 110 of the portable terminal 100.

1-4. Recognition of Touch Operation

In this manner, the portable terminal 100 recognizes the touch operation or the proximity operation on or to the touch screen 102 as an input operation. Hereinafter, the recognition of the touch operation in the portable terminal 100 will be described in detail.

As described above, the CPU 110 acquires the output value of each electrostatic sensor from the touch panel 102B at the interval of the constant time and detects the touch position or the proximity position. The CPU 110 stores position data indicating the touch position or the proximity position as history data, which indicates the history of the touch and the proximity on or to the operation surface, in the non-volatile memory 111. The CPU 110 maintains the predetermined number (for example, five or six) of position data at time earlier than the current time as the history data in the non-volatile memory 111.

When detecting that the touch of the finger on the operation surface continues for a time equal to or longer than a predetermined time based on the history data, the CPU 110 recognizes an operation of continuously touching the finger on the operation surface, that is, the dragging and thus recognizes the dragging as an input operation.

On the other hand, when detecting that the finger is detached from the operation surface before the predetermined time elapses based on the history data, the CPU 110 recognizes that the finger is detached immediately after the finger touches the operation surface.

Then, the CPU 110 calculates the distance between the touch position (which is referred to as a start touch position) when it is detected that the finger starts touching the operation surface and the touch position (which is referred to as an end touch position) immediately before the time at which it is detected that the finger is detached from the operation surface. That is, the CPU 110 calculates the movement distance (that is, a movement distance of the finger while the finger touches the operation surface) of the touch position.

The CPU 110 detects the movement of the touch position and determines that the performed input operation is flicking, when the distance between the start touch position and the end touch position is equal to or greater than a predetermined value. On the other hand, the CPU 110 detects no movement of the touch position and determines that the performed input operation is tapping, when the distance between the start touch position and the end touch position is less than a predetermined value. The predetermined value is a value in which it is considered that the touch position is barely moved. For example, the predetermined value is set in advance so that the movement distance of the touch position occurring due to the unintended shaking or the like of the user's finger is less than the predetermined value.

Figure 6:
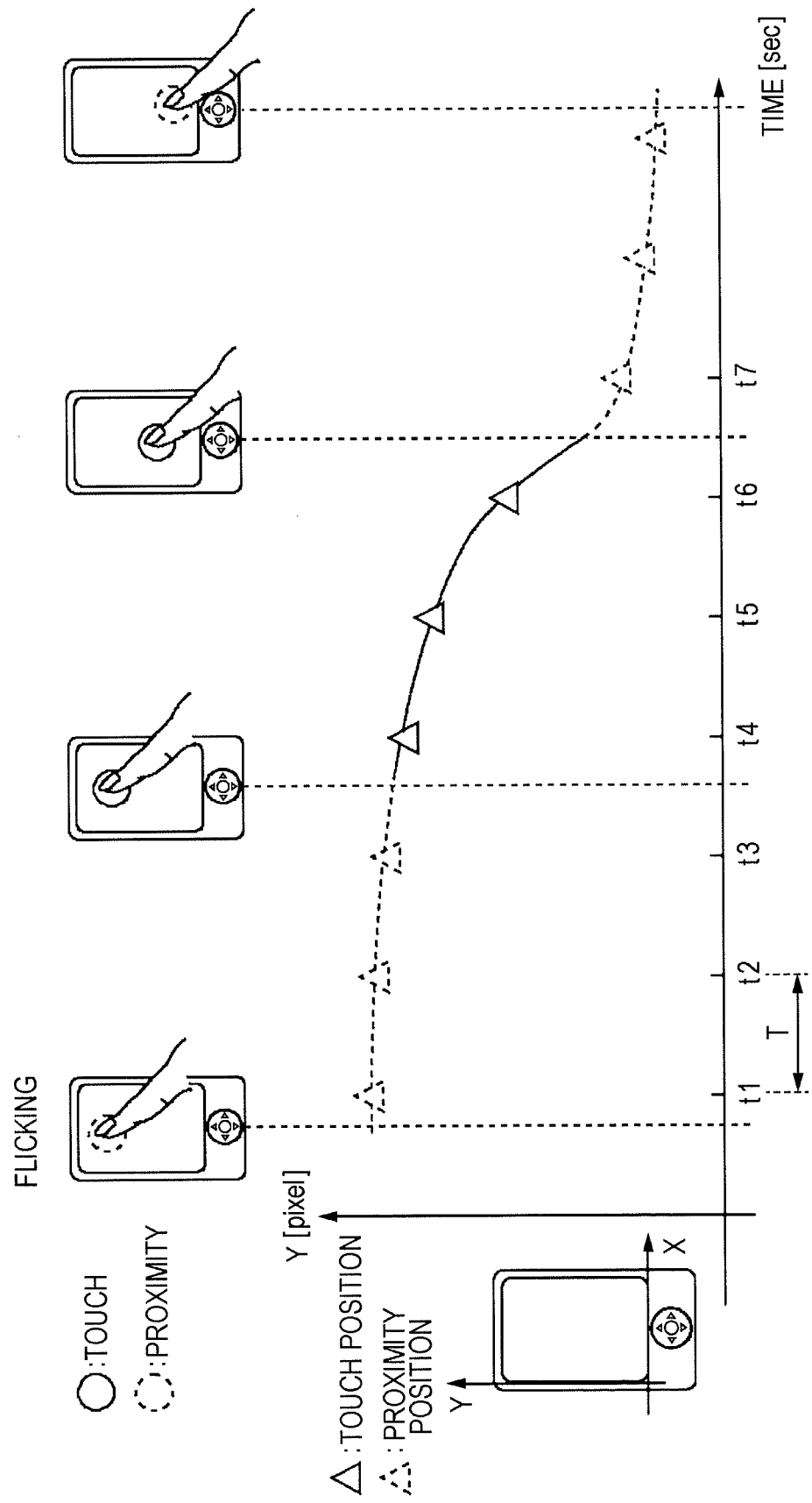
FIG. 6 is a schematic diagram illustrating description of a touch position and a proximity position (1) when flicking is performed.

For example, as shown in FIG. 6, suppose that flicking is performed on the operation surface of the touch panel 102B in a screen downward direction (negative direction of a Y axis in the drawing).

At this time, the CPU 110 acquires the output value of each electrostatic sensor from the touch panel 102B at the interval of the constant time T and detects the touch position or the proximity position. For example, the CPU 110 detects the proximity position at time t1 to time t3, detects the touch position at time t4 to time t6, and detects the proximity position at time t7.

When recognizing that the finger is detached from the operation surface immediately after the finger touches the operation surface at time t7, the CPU 110 calculates the distance between the start touch position and the end touch position based on the history data.

When recognizing that the distance between the start touch position and the end touch position is equal to or greater than the predetermined value, the CPU 110 determines that the performed input operation is flicking. In addition, when detecting a vector in which the start touch position is the start point and the end touch position is the end point and recognizing that the finger is moved in the screen downward direction from the vector, the CPU 110 recognizes that the flicking is performed in the screen downward direction.

Figure 7:
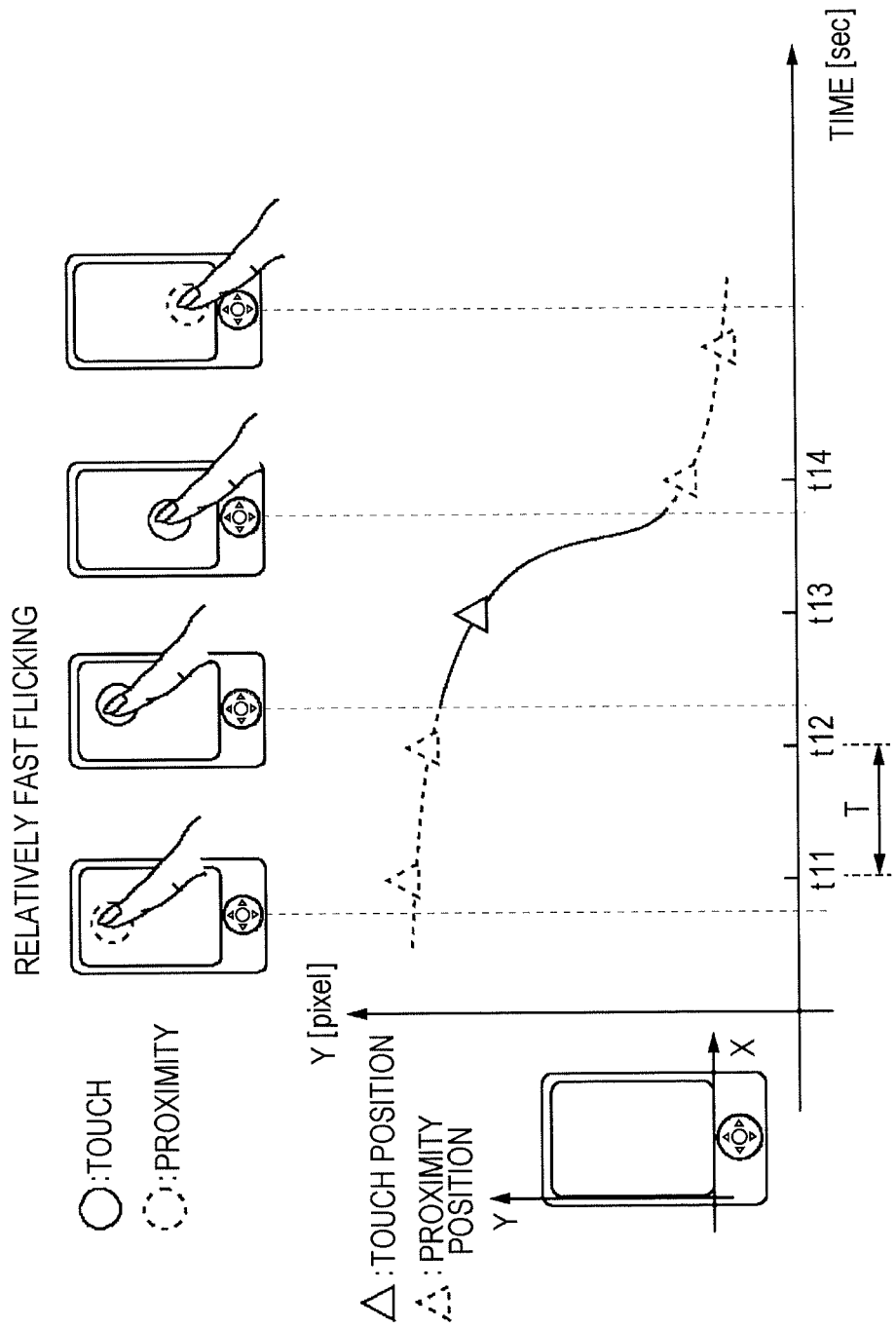
FIG. 7 is a schematic diagram illustrating description of a touch position and a proximity position (2) when flicking is performed.

On the other hand, as shown in FIG. 7, suppose that the flicking is performed faster than the flicking shown in FIG. 6 on the operation surface of the touch panel 102B in the screen downward direction.

At this time, the CPU 110 acquires the output value of each electrostatic sensor from the touch panel 102B at the interval of the constant time T and detects the touch position or the proximity position. For example, the CPU 110 detects the proximity position at time t11 and time t12, detects the touch position at time t13, and detects the proximity position at time t14.

In this case, since the flicking is performed faster than the flicking shown in FIG. 6, the time in which the finger touches the operation surface is shorter and thus only one touch position is detected.

Therefore, since the CPU 110 recognizes that the finger is detached from the operation surface immediately after the finger touches the operation surface at time t14, the CPU 110 does not calculate the distance between the start touch position and the end touch position and thus may not detect that the touch position is moved.

That is, although the user flicks the touch panel 102B, the portable terminal 100 does not recognize that the user has flicked the touch panel 102B and thus the user may feel a sense of displeasure.

In this case, the portable terminal 100 recognizes the touch operation using not only the touch position but also the proximity position.

Specifically, when at time t14 recognizing that finger is detached from the operation surface immediately after the finger touches the operation surface, the CPU 110 counts the number of touch positions detected while the finger touches the operation surface based on the history data.

When the number of touch positions is one, the CPU 110 recognizes the touch operation based on not only the touch position but also the proximity positions detected immediately before the finger touches the operation surface and immediately after the finger is detached from the operation surface (here, time t12 and time t14).

Figure 8:
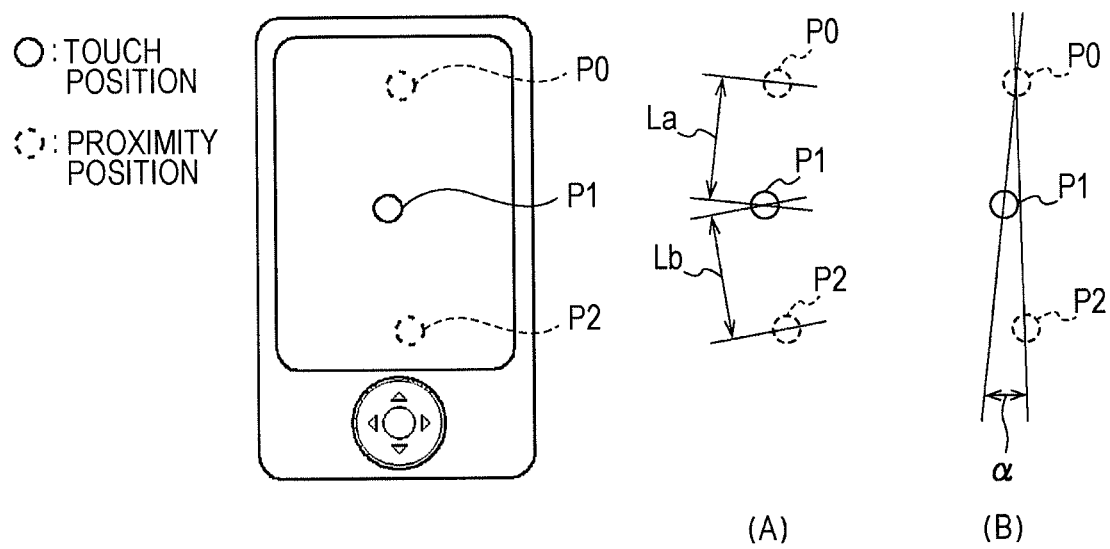
FIG. 8 is a schematic diagram illustrating description of a touch position and a proximity position (3) when flicking is performed.

In part (A) and part (B) of FIG. 8, the position relationship among a proximity position P0 at time t12 immediately before the touch of the finger, a touch position P1 at time t13, and a proximity position P2 at time t14 immediately after the detachment of the finger is shown, when the flicking is performed in the screen downward direction shown in FIG. 7. The proximity position at the time immediately before the touch of a finger is referred to as a proximity position before touch. The proximity position at the time immediately after the detachment of a finger is referred to as a proximity position after touch.

In the flicking, it is assumed that when the user lightly flicks the operation surface with the finger, the finger is moved straightly in a nearly constant direction (here, the screen downward direction) until the finger becomes close to the operation surface, touches the operation surface, and then becomes distant from the operation surface, that is, before the touch, after the touch, and during the touch. Therefore, it is considered that a distance La between the proximity position P0 before touch and the touch position P1 and a distant Lb between the touch position P1 and the proximity position P2 after touch are relatively lengthened. Moreover, it is considered that an angle $\alpha$ formed by the straight line passing through the proximity position P0 before touch and the touch position P1 and the straight line passing through the proximity position P0 before touch and the proximity position P2 after touch becomes relatively small.

Figure 9:
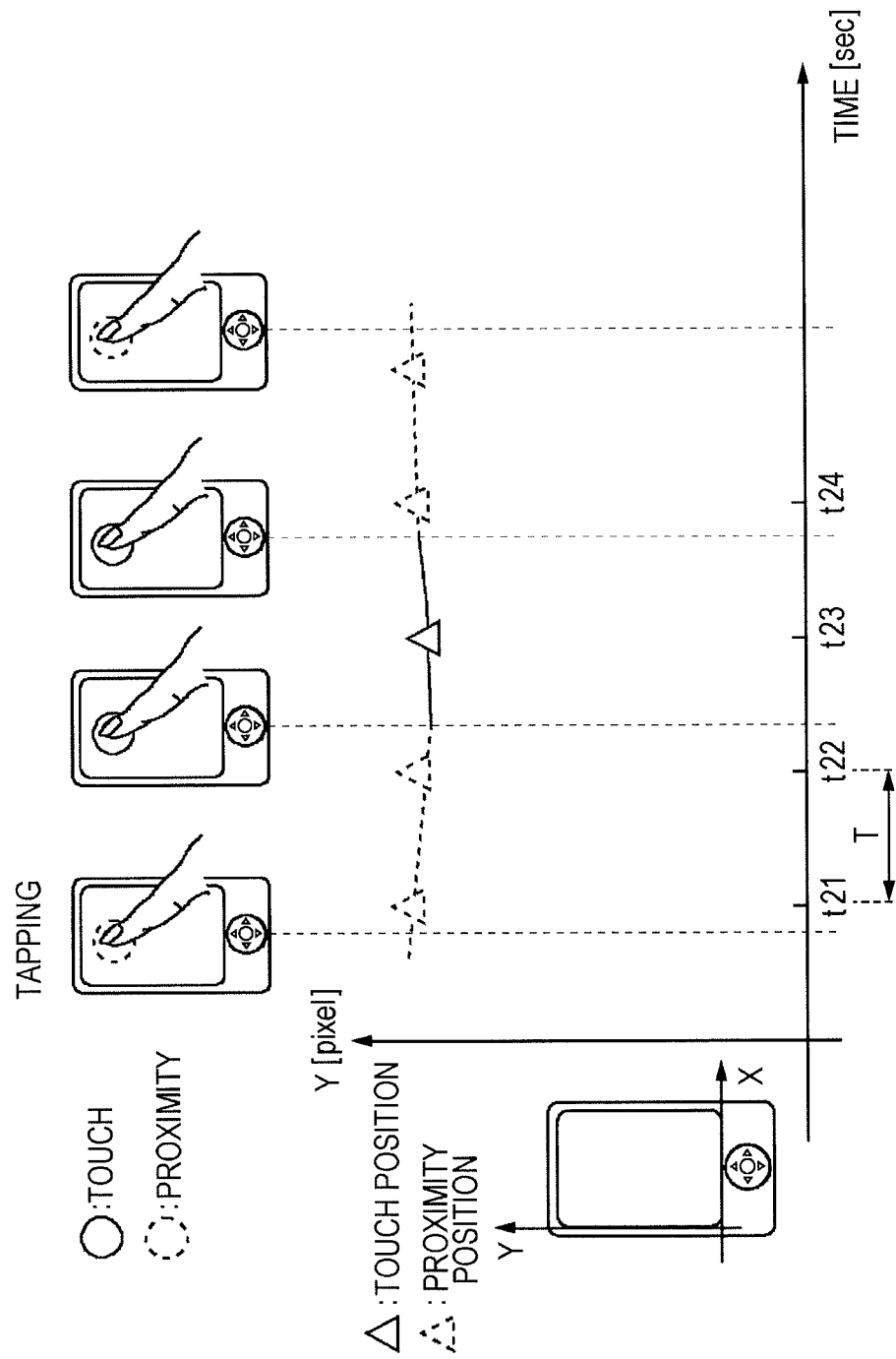
FIG. 9 is a schematic diagram illustrating description of a touch position and a proximity position (1) when tapping is performed.

On the other hand, as shown in FIG. 9, suppose that when tapping on the touch panel 102B is performed, the CPU 110 detects, for example, the proximity positions at time t21 and time t22, detects the touch position at time t23, and detects the proximity position at time t24.

Figure 10:
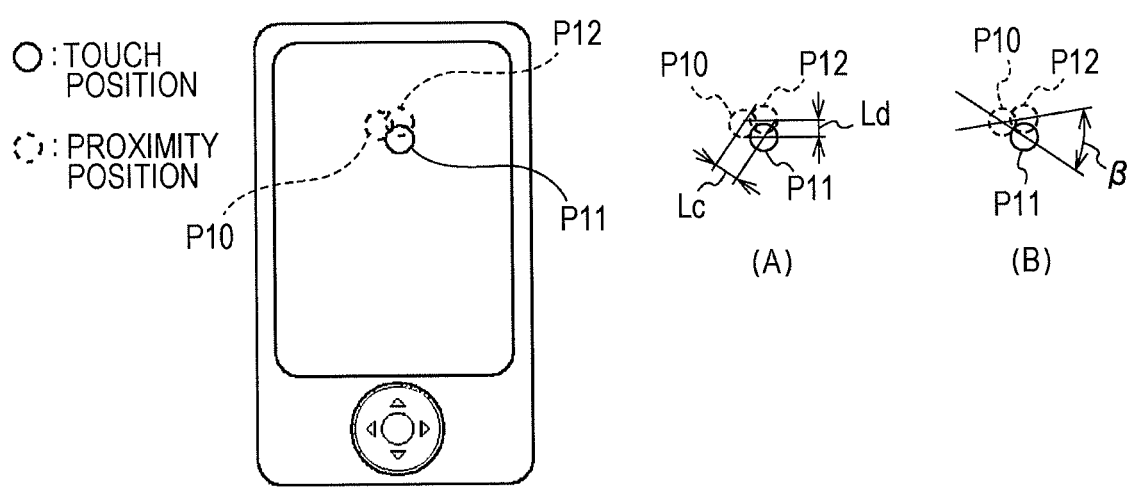
FIG. 10 is a schematic diagram illustrating description of a touch position and a proximity position (2) when tapping is performed.

In this case, part (A) and part (B) of FIG. 10 shows a position relationship among a proximity position P10 before touch at time t22, a touch position P11 at time t23, and a proximity position P12 after touch at time t24 on the operation surface of the touch panel 102B.

In the tapping, it is assumed that when the user touches one arbitrary point on the operation surface with his finger, the finger is moved nearly vertically toward the one arbitrary point on the operation surface until the finger becomes close to the operation surface, touches the operation surface, and then becomes distant from the operation surface. That is, since the position of the finger is barely moved on the surface parallel to the operation surface before the touch, after the touch, and during the touch, a distance Lc between the proximity position P10 before touch and the touch position P11 and a distance Ld between the touch position P11 and the proximity position P12 after touch become shorter compared to the case when the flicking is performed.

In the tapping, it is assumed that when the user moves his finger on the surface parallel to the operation surface due to the unintended shaking or the like of the user's finger, the movement direction of the finger on the surface parallel to the operation surface is not constant. Therefore, it is considered that an angle $\beta$ formed by the straight line passing through the proximity position P10 before touch and the touch position P11 and the straight line passing through the proximity position P10 before touch and the proximity position P12 after touch is relatively larger compared to the case when the flicking is performed.

Then, when the number of touch positions detected during the touch of the finger is one, the CPU 110 determines whether the distance between the proximity position before touch and the touch position and the distance between the touch position and the proximity position after touch (which are both referred to as a touch position movement distance) are equal to or greater than a predetermined value. This predetermined value is set in advance so that the proximity touch movement distance is equal to or greater than a predetermined value when the user lightly flicks the operation surface with his finger and the proximity touch movement distance caused due to the unintended shaking or the like of the user's finger in the tapping is less than the predetermined value.

Moreover, the CPU 110 determines whether the angle (which is referred to as a proximity touch movement angle) formed by the straight line passing through the proximity position before touch and the touch position and the straight line passing through the proximity position before touch and the proximity position after touch is equal to or less than a predetermined value. This predetermined value is set in advance so that the proximity touch movement angle is equal to or less than the predetermined value when the user moves his finger in a given direction in the flicking and the proximity touch movement angle caused due to the unintended shaking or the like of the user's finger in the tapping is greater than the predetermined value.

When determining that the proximity touch movement distance is equal to or greater than the predetermined value and the proximity touch movement angle is equal to or less than the predetermined value, the CPU 110 determines that the input operation on the touch panel 102B is the flicking and thus recognizes the flicking is performed.

On the other hand, when determining that the proximity touch movement distance is less than the predetermined value or the proximity touch movement angle is greater than the predetermined value, the CPU 110 determines that the input operation on the touch panel 102B is the tapping and thus recognizes that the tapping is performed.

Thus, when the number of touch positions detected during the touch of the finger is one, the CPU 110 recognizes the flicking or the tapping based on both the touch position and the proximity positions (the proximity position before touch and the proximity position after touch) detected before and after the touch of the finger.

When the number of touch positions detected during the touch of the finger is two or more, the CPU 110 detects whether the touch position is moved, as described above, and thus recognizes the flicking or the tapping based on the detection result. That is, when the number of touch positions detected during the touch of the finger is two or more, the CPU 110 recognizes the flicking and the tapping based on only the touch positions.

In this manner, the portable terminal 100 recognizes the touch operation (tapping and flicking) on the touch panel 102B.

1-5. Operation Recognition Processing Order

Figure 11:
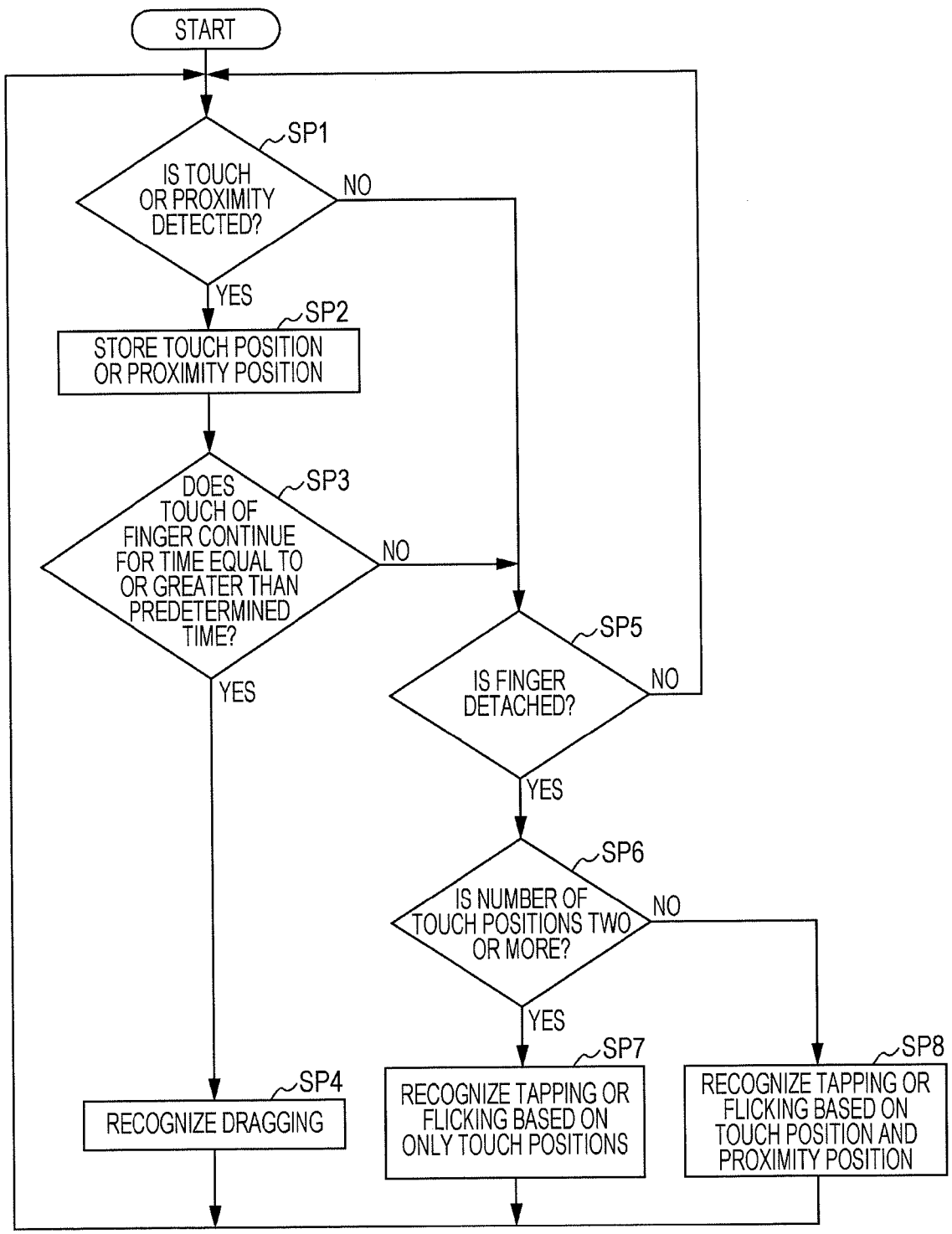
FIG. 11 is a flowchart illustrating operation recognition processing order.

Next, processing order (which is referred to as operation recognition processing order) RT1 in which the above-described touch operation is recognized will be described with reference to the flowchart of FIG. 11. The operation recognition processing order RT1 is processing order in which the CPU 110 executes the touch operation according to a program stored in the non-volatile memory 111.

For example, when the portable terminal 100 is turned on, the CPU 110 starts the operation recognition processing order RT1 and allows the process to proceed to step SP1.

In step SP1, the CPU 110 determines whether the touch or the proximity of the finger on or to the touch panel 102B is detected.

When the touch or the proximity of the finger is detected and thus the positive result is obtained in step SP1, the CPU 110 allows the process to proceed to step SP2 subsequent to step SP1.

In step SP2, the CPU 110 stores position data indicating the detected touch position or the detected proximity position of the finger as the history data in the non-volatile memory 111, and then allows the process to proceed to step SP3 subsequent to step SP2.

In step SP3, the CPU 110 determines whether the touch of the finger continues for a time equal to or longer than a predetermined time based on the history data.

When the positive result is obtained in step SP3, it means that the operation surface is continuously touched with the finger, and then the CPU 110 allows the process to proceed to step SP4 subsequent to step SP3.

In step SP4, the CPU 110 determines that the operation input on the touch panel 102B is dragging, thus recognizes that the dragging is performed, and thus performs the process corresponding to the dragging. Then, the process returns to step SP1.

On the other hand, when the touch of the finger does not continues for the time equal to or longer than the predetermined time and thus the negative result is obtained in step SP3, the CPU 110 allows the process to proceed to step SP5 subsequent to step SP4.

When the touch or proximity of the finger is not detected and thus the negative result is obtained in step SP1, the CPU 110 allows the process to proceed to step SP5 subsequent to step SP4.

In step SP5, the CPU 110 determines whether the finger is detached from the operation surface based on the history data. Specifically, when the touch positions are not continuously detected, the CPU 110 determines that the finger is detached from the operation surface.

When the negative result is obtained in step SP5, it means that the finger continuously touches the operation surface or the finger does not originally touch the operation surface. Then, the CPU 110 allows the process returns to step SP1.

On the other hand, when the finger is detached from the operation surface and thus the positive result is obtained in step SP5, it means that the finger is detached from the operation surface before the touch of the finger continues for the time equal to or longer than the predetermined time, that is, it means that the finger is detached from the operation surface immediately after the finger touches the operation surface. Then, the CPU 110 allows the process to proceed to step SP6 subsequent to step SP5.

In step SP6, based on the history data, the CPU 110 determines whether the number of touch positions detected during the touch of the finger on the operation surface is two or more.

When the positive result is obtained in step SP6, it means that the tapping or the flicking can be recognized using only the touch positions. Then, the CPU 110 allows the process to proceed to step SP7 subsequent to step SP6.

In step SP7, as described above, based on only the touch positions, the CPU 110 determines whether the input operation on the touch panel 102B is the flicking or the tapping, and thus recognizes that the flicking or the tapping is performed. Then, the CPU 110 performs a process according to the recognized flicking or tapping, and again allows the process to return to step SP1.

On the other hand, when the number of touch positions detected during the touch of the finger on the operation surface is one and thus negative result is obtained at step SP6, it means that the tapping or flicking may not be recognized using only the touch position. Then, the CPU 110 allows the process to proceed to step SP8 subsequent to step SP7.

In sep SP8, as described above, based on the touch position and the proximity positions before and after the touch of the finger, the CPU 110 determines whether the input operation on the touch panel 102B is the flicking or the tapping and thus recognizes that the flicking or the tapping is performed. Then, the CPU 110 performs a process according to the recognized flicking or tapping, and again allows the process to return to step SP1.

According to the operation recognition processing order RT1, the CPU 110 of the portable terminal 100 recognizes the touch operation.

1-6. Process and Advantage

The portable terminal 100 having the above-described configuration acquires the output value of the electrostatic capacitance type touch panel 102B at the interval of the constant time T and detects the touch position or the proximity position.

Here, the portable terminal 100 determines whether the number of touch positions detected during the touch of the finger on the operation surface is two or more, when detecting that the finger is detached from the operation surface immediately after the operation surface of the touch panel 102B is touched with the finger.

Then, when the number of touch positions is two or more, the portable terminal 100 determines whether the operation input on the touch panel 102B is the flicking or the tapping, based on only the touch positions, and thus recognizes that the flicking or the tapping is performed.

On the other hand, when the number of touch positions is less than two, that is, the number of touch positions is one, the portable terminal 100 determines whether the input operation on the touch panel 102B is the flicking or the tapping based on the touch position and the proximity positions detected before and after the touch of the finger, and thus recognizes that the flicking or the tapping is performed.

In this manner, when the number of touch positions detected during the touch of the finger on the operation surface is one, the portable terminal 100 determines whether the touch of the instruction object is a predetermined input operation (tapping or flicking) based on both the touch position and the proximity positions before and after the touch of the finger. That is, the portable terminal 100 determines that the touch of the instruction object is the predetermined input operation (tapping or flicking) based on the series of movements of the finger approaching, touching, and being detached from the operation surface.

Thus, the portable terminal 100 can reliably recognize the input operation (that is, touch operation) by the touch of the instruction object, even when it may not be recognized which input operation is performed using only the touch positions since the number of touch positions is small.

Accordingly, the portable terminal 100 can reliably recognizes the touch operation (tapping or flicking) as in the related art, even when the sampling interval becomes longer since the sensitivity of the touch panel increases to detect the proximity of the finger. Therefore, the portable terminal 100 can implement various input operations including the proximity operation while maintaining the operability as in the related art.

Accordingly, in the portable terminal 100, the recognition precision of the touch operation can be improved although the sampling interval is shortened and the number of touch positions detected at the interval of the constant time does not increase. Therefore, it is possible to prevent an increase in consumption power caused, for example, since the sampling interval is shortened.

In the portable terminal 100, the amount of calculation becomes larger when the touch operation is recognized using both the touch position and the proximity positions than when the touch operation is recognized using only the touch positions. Therefore, the processing load may increase.

In the portable terminal 100, however, the touch operation is recognized using only the touch position, when the number of touch positions is two or more, that is, whether it is detected that the touch position is moved and thus the touch operation can be recognized using only the touch positions. In the portable terminal 100, moreover, the touch operation is recognized using both the touch position and the proximity positions, only when the number of touch positions is one, that is, only when it is not detected whether the touch position is moved and thus the touch operation may not be recognized using only the touch positions.

Accordingly, in the portable terminal 100, the processing load can be suppressed while the touch operation can be recognized with precision.

In the portable terminal 100 having the above-described configuration, by recognizing the touch operation based on the touch position and the proximity positions before and after the touch of the finger, it is possible to improve the recognition precision of the touch operation compared to a case where the touch operation is recognized based on only the touch positions.

2. Other Embodiments 2-1. Other Embodiment 1

In the above-described embodiment, the CPU 110 determines whether the input operation is the predetermined touch operation based on the touch position and the proximity positions detected before and after the touch of the finger, when the number of touch position detected during the touch of the finger is less than two, that is, only when the number of touch position is one.

However, the invention is not limited to the case where the number of touch positions is less than two. Instead, the CPU 110 may determine whether the input operation is a predetermined touch operation based on the touch position and the proximity positions detected before and after the touch of the finger, when the number of touch positions is smaller than various kinds of predetermined numbers.

The predetermined number may be set to various values, as long as the predetermined number used to determine whether the touch position is moved is two or more. As the predetermined number increases, the recognition precision of the touch operation becomes higher, but the processing load of the CPU 110 may thus increase since the amount of calculation increases. Accordingly, the predetermined number may be set additionally based on the recognition precision of the touch operation or the processing capability of the CPU 110.

However, the invention is not limited thereto. Instead, the CPU 110 may determine whether the input operation is the predetermined touch operation, based on the touch position and the proximity positions detected before and after the touch of the finger, irrespective of the number of touch positions detected during the touch of the finger.

2-2. Other Embodiment 2

In the above-described embodiment, the CPU 110 determines whether the input operation is the predetermined touch operation based on the touch position detected during the touch of the finger and the proximity positions detected immediately before the touch of the finger and immediately after the detachment of the finger.

However, the invention is not limited thereto. Instead, the CPU 110 may determine whether the input operation is the predetermined touch operation, based on the touch position and one of the proximity positions detected before and after the touch of the finger.

In this case, the CPU 110 may determine whether the input operation is the predetermined touch operation, based on the touch position and the proximity position detected before the touch of the finger, when the predetermined touch operation is a touch operation in which there is a characteristic in the movement of the finger until the finger becomes closer and then touches the operation surface. On the other hand, the CPU 110 may determine whether the input operation is the predetermined touch operation, based on the touch position and the proximity position detected after the touch of the finger (after the detachment of the finger), when the predetermined touch operation is a touch operation in which there is a characteristic in the movement of the finger until the finger touches the operation surface and then is detached from the operation surface.

For example, the CPU 110 may determine whether the input operation is the predetermined touch operation, based on the touch position and some positions (for example, the proximity positions or the like detected immediately before the touch of the finger and detected right before the previous immediate touch of the finger) of the proximity positions detected before and after the touch of the finger.

2-3. Other Embodiment 3

In the above-described embodiment, the CPU 110 determines whether the input operation is the predetermined touch operation, based on the distances (the proximity touch movement distances) between the touch position detected during the touch of the finger and the proximity positions detected before and after the touch of the finger.

However, the invention is not limited thereto. Instead, the CPU 110 may determine whether the input operation is the predetermined touch operation, based on the distance between any two points of the touch position and the proximity positions. For example, the CPU 110 may determine whether the input operation is the predetermined touch operation, based on the distance between the proximity position detected before the touch of the finger and the proximity position detected after the touch of the finger.

2-4. Other Embodiment 4

In the above-described embodiment, the CPU 110 determines whether the input operation is the predetermined touch operation, based on the angle (the proximity touch movement angle) formed by the straight line passing through the proximity position detected before the touch of the finger and the touch position detected during the touch of the finger and the straight line passing through the proximity position detected before the touch of the finger and the proximity position detected after the touch of the finger.

However, the invention is not limited thereto. Instead, the CPU 110 may determine whether the input operation is the predetermined touch operation, based on an angle formed by the straight lines passing through any two points of the touch position and the proximity positions. For example, the CPU 110 may determine whether the input operation is the predetermined touch operation, based on an angle formed by the straight line passing through the proximity position detected before the touch of the finger and the touch position and the straight line passing through the touch position and the proximity position detected after the touch of the finger.

2-5. Other Embodiment 5

In the above-described embodiment, the CPU 110 determines whether the input operation is the predetermined touch operation, based on the proximity touch movement distance and the proximity touch movement angle.

However, the invention is not limited thereto. Instead, the CPU 110 may recognize the touch operation based on any one of the proximity touch movement distance and the proximity touch movement angle.

Moreover, instead of the proximity touch movement distance or the proximity touch movement angle, the CPU 110 may determine whether the input operation is the predetermined touch operation, based on various other position relationships, as long as the position relationships are a position relationship between the touch position detected during the touch of the finger and at least one of the proximity positions detected before and after the touch of the finger.

For example, the CPU 110 may detect the minimum range (for example, range of a circular shape) including the touch position and the proximity positions and may determine whether the area of the range is equal to or greater than a predetermined value. The CPU 110 may determine that the input operation is an operation of moving the finger on the operation surface, that is, the flicking, when the area of the range is equal to or greater than the predetermined value. The CPU 110 may determine that the input operation is an operation in which the finger is barely moved on the operation surface, that is, the tapping, when the area of the range is less than the predetermined value.

2-6. Other Embodiment 6

In the above-described embodiment, the CPU 110 determines whether the performed input operation is the tapping or the flicking, based on the touch position detected during the touch of the finger and the proximity positions before and after the touch of the finger.

However, the invention is not limited thereto. Instead, the CPU 110 may determine various other predetermined touch operations based on the touch position and the proximity positions before and after the touch of the finger, when the predetermined touch operation is a touch operation in which there is a characteristic in movement of the finger while the finger approaches the operation surface and then the operation surface is touched with the finger or movement of the finger while the operation surface is touched with the finger and the finger is detached from the operation surface.

For example, when the operation surface is touched with the finger at two points on the operation surface, the CPU 110 detects that the number of touch positions detected during the touch of the finger at each of the points at which the operation surface is touched with the finger is one. In this case, based on only the touch positions, the CPU 110 may not recognize whether two points are simultaneously tapped (which is called two-point tapping), whether an operation (pinch-in) of spreading two fingers touching the operation surface is performed, or whether an operation (pinch-out) of narrowing two fingers touching the operation surface is performed.

In this case, the CPU 110 recognizes whether two fingers are moved on the surface parallel to the operation surface based on both the touch position and the proximity position detected after the touch of the finger, and determines whether the two-point tapping is performed or the pinch-in or pinch-out is performed.

Moreover, the CPU 110 recognizes whether two fingers are moved in a direction in which the two fingers are closer to each other on the surface parallel to the operation surface or in a direction in which the two fingers are distant from each other, based on the touch position and the proximity position, and determines whether the pinch-in is performed or the pinch-out is performed.

2-7. Other Embodiment 7

In the above-described embodiment, the CPU 110 determines whether the input operation is the predetermined touch operation, based on the touch position and the proximity positions, only when the number of touch positions detected during the touch of the finger is one.

However, the invention is not limited thereto. Instead, the CPU 110 may determine whether the input operation is the predetermined touch operation based on the touch position and the proximity positions under various other conditions, or may change the determination of the predetermined touch operation based on only the touch position. That is, the CPU 110 may determine the touch operation based on only the touch position, when the predetermined touch operation can be determined based on only the touch position, and may determine the touch operation based on the touch position and the proximity positions, only when the predetermined touch operation may not determined based on only the touch position. Thus, in the portable terminal 100, the processing load can be suppressed while the touch operation can be recognized with precision.

For example, the CPU 110 may determine whether the input operation is the flicking, based on the touch position and the proximity positions, only when an application in which the flicking is received as an input operation is executed. That is, the CPU 110 may recognize the tapping based on only the touch position, since it is not necessary to distinguish the tapping from the flicking, for example, in a case of an application in which only the tapping is received as the input operation.

For example, the CPU 110 may determine whether the input operation is the flicking, based on the touch position and the proximity positions, only when the flicking can correspond to a touch position in a case where the touch position is detected. That is, the CPU 110 may recognize the tapping without performing the process of distinguish the tapping from the flicking, when only the tapping can correspond to the touch position (for example, when a button is displayed at a portion on the liquid crystal panel 102A corresponding to the touch position).

2-8. Other Embodiment 8

In the above-described embodiment, the user's finger has hitherto been used as an instruction object used to perform the touch operation on the touch panel 102B. However, the invention is not limited thereto. Instead, various instruction objects such as a pencil, a bar, or a dedicated touch pen may be used, when the instruction object is an instruction object with which the touch and the proximity can be detected on the touch panel.

2-9. Other Embodiment 9

In the above-described embodiment, the portable terminal 100 is provided with the electrostatic capacitance type touch panel 102B as a device for detecting the touch and the proximity of the instruction object on an to the operation surface.

However, the invention is not limited thereto. Instead, the portable terminal 100 may be provided with various other input operation devices such as an optical sensor type touch screen having an optical sensor in a liquid crystal panel, when the device is an input operation device capable of detecting the touch and the proximity of the instruction object on and to the operation surface.

Various display devices such as an organic EL (Electro Luminescence) panel may be used instead of the liquid crystal panel 102A.

2-10. Other Embodiment 10

In the above-described embodiment, the portable terminal 100 serving as the information processing apparatus 1 includes the touch panel 102B serving as the touch detection unit 2 and the proximity detection unit 3. Moreover, the CPU 110 serving as the control unit 4 is provided.

However, the embodiments of the invention are not limited thereto. As long as the same function is implemented, the respective units of the above-described portable terminal 100 may be configured by different various types of hardware or software.

Moreover, the embodiment of the invention is not limited to the portable terminal 100, but is applicable to various apparatuses such as a digital still camera, a desktop personal computer, a game console, a portable audio player, and a portable phone.

2-11. Other Embodiment 11

In the above-described embodiments, the programs executing various kinds of processing are stored in the non-volatile memory 111 of the portable terminal 100.

However, the embodiments of the invention are not limited thereto. For example, the portable terminal 100 may be provided with a slot for a storage medium such as a memory card and the CPU 110 may read a program from the storage medium inserted into the slot and execute the program. Moreover, the CPU 110 may download the program via the network I/F 114 and may install the program in the non-volatile memory 111.

The present application contains subject matter related to that disclosed in Japanese Priority Patent Application JP 2010-009184 filed in the Japan Patent Office on Jan. 19, 2010, the entire content of which is hereby incorporated by reference.

The invention is not limited to the above-described embodiments and the other embodiments. That is, the invention may be modified in combination forms of parts or the entirety of the above-described embodiments and the other embodiments or partially extracted forms thereof within the scope of the invention.

What is claimed is:

1. An information processing apparatus comprising:
a touch detection unit configured to detect touch of an instruction object on an operation surface and obtain a touch detection result;
a proximity detection unit configured to detect proximity of the instruction object to the operation surface and obtain a before touch proximity detection result and an after touch proximity detection result; and
a control unit determining whether the touch of the instruction object is a predetermined input operation based on a first touch detection result and at least one of a second touch detection result, a before touch proximity detection result, and an after touch proximity detection result;
wherein, when the second touch detection result is used to determine whether the touch of the instruction object is the predetermined input operation, a determination is made based on the second touch detection result as to whether at least one of the before touch proximity detection result and the after touch proximity detection result is also used to determine whether the touch of the instruction object is the predetermined input operation, and
the first touch detection result and the second touch detection result are non-simultaneous touch detection results.

2. The information processing apparatus according to claim 1,
wherein the touch detection unit detects non-simultaneous touch positions of the instruction object on the operation surface at a predetermined time interval, and
wherein the control unit determines whether the touch of the instruction object is a predetermined input operation based on the number of non-simultaneous touch positions detected by the touch detection unit when the operation surface is touched with the instruction object.

3. The information processing apparatus according to claim 1, wherein the control unit determines whether the touch of the instruction object is a predetermined input operation based on a touch position of the instruction object detected by the touch detection unit and at least one of proximity positions of the instruction object detected by the proximity detection unit before and after the touch of the instruction object.

4. The information processing apparatus according to claim 3, wherein the control unit determines whether the touch of the instruction object is a predetermined input operation based on a distance between two points of the touch position and the proximity position.

5. The information processing apparatus according to claim 3, wherein the control unit determines whether the touch of the instruction object is a predetermined input operation based on an angle formed between a first straight line and a second straight line, the first straight line defined by a first set of two points selected from among the touch position and the proximity positions, and the second straight line defined by a second set of two points selected from among the touch position and the proximity positions, wherein the first set of two points and the second set of two points are different.

6. The information processing apparatus according to claim 1,
wherein the control unit further determines whether the touch of the instruction object is the predetermined input operation based on a number of touches detected as the touch detection result.

7. The information processing apparatus according to claim 1,
wherein when the control unit determines that both the first touch detection result and the second touch detection result are positive detections, the control unit determines that the predetermined input operation is a flick operation.

8. The information processing apparatus according to claim 1,
wherein when the control unit determines that the first touch detection result is a positive detection and that the second touch detection result is a negative detection, the control unit determines whether the touch of the instruction object is the predetermined input operation based on the first touch detection result and at least one of the before touch proximity detection result and the after touch proximity detection result, and
wherein when the control unit determines that both the first touch detection result and the second touch detection result are positive detections, the control unit determines whether the touch of the instruction object is the predetermined input operation without consideration of any proximity detection results of the instruction object.

9. The information processing apparatus according to claim 1,
wherein the before touch proximity detection result comprises a proximity position of the instruction object detected immediately before the touch of the instruction object on the operation surface, and the after touch proximity detection result comprises a proximity position of the instruction object detected immediately after removal of the touch of the instruction object from the operation surface.

10. The information processing apparatus according to claim 1,
wherein when the control unit determines that the first touch detection result is a positive detection, that the second touch detection result is a negative detection, and that at least one of the before touch proximity detection result and the after touch proximity detection result indicates a location of the instruction object that is farther than a predetermined distance from a position of the instruction object at a beginning of the touch, the control unit determines that the predetermined input operation is a flick operation.

11. The information processing apparatus according to claim 1,
wherein when the control unit determines that the first touch detection result is a positive detection, that the second touch detection result is a negative detection, and that at least one of the before touch proximity detection result and the after touch proximity detection result indicates a location of the instruction object that is farther than a predetermined distance from a position of the instruction object associated with the first touch detection result, the control unit determines that the predetermined input operation is a flick operation.

12. An input operation determination method comprising the steps of:
detecting touch of an instruction object on an operation surface by a touch detection unit;
obtaining a touch detection result;
detecting proximity of the instruction object to the operation surface by a proximity detection unit;
obtaining a before touch proximity detection result and an after touch proximity detection result; and
determining whether the touch of the instruction object is a predetermined input operation based on a first touch detection result and at least one of a second touch detection result, the before touch proximity detection result, and the after touch proximity detection result;
wherein, when the second touch detection result is used to determine whether the touch of the instruction object is the predetermined input operation, a determination is made based on the second touch detection result as to whether at least one of the before touch proximity detection result and the after touch proximity detection result is also used to determine whether the touch of the instruction object is the predetermined input operation, and
the first touch detection result and the second touch detection result are non-simultaneous touch detection results.

13. An input operation determination program stored on a non-transitory computer readable medium causing an information processing apparatus to execute the steps of:
detecting touch of an instruction object on an operation surface by a touch detection unit;
obtaining a touch detection result;
detecting proximity of the instruction object to the operation surface by a proximity detection unit;
obtaining a before touch proximity detection result and an after touch proximity detection result; and
determining whether the touch of the instruction object is a predetermined input operation based on a first touch detection result and at least one of a second touch detection result, the before touch proximity detection result, and the after touch proximity detection result;
wherein, when the second touch detection result is used to determine whether the touch of the instruction object is the predetermined input operation, a determination is made based on the second touch detection result as to whether at least one of the before touch proximity detection result and the after touch proximity detection result is also used to determine whether the touch of the instruction object is the predetermined input operation, and
the first touch detection result and the second touch detection result are non-simultaneous touch detection results.

* * * * *